United States Patent

Ogawa

[15] 3,705,522

[45] Dec. 12, 1972

[54] SPEED CHANGE MECHANISM

[72] Inventor: Fremont T. Ogawa, Royal Oak, Mich.

[73] Assignee: General Motors Corporation, Detroit, Mich.

[22] Filed: June 30, 1971

[21] Appl. No.: 158,169

[52] U.S. Cl. ................................................74/803
[51] Int. Cl. ...........................................F16h 1/28
[58] Field of Search........................................74/803

[56] References Cited

UNITED STATES PATENTS

| | | | |
|---|---|---|---|
| 2,868,037 | 1/1959 | Hindmarch | 74/803 X |
| 2,955,487 | 10/1960 | Malley | 74/803 |
| 3,453,907 | 7/1969 | Noguchi et al. | 74/803 |

FOREIGN PATENTS OR APPLICATIONS

| | | | |
|---|---|---|---|
| 32,749 | 1/1924 | Denmark | 74/803 |

*Primary Examiner*—Arthur T. McKeon
*Attorney*—W. E. Finken et al.

[57] ABSTRACT

A speed change mechanism for providing a high gear ratio between the input and output members in which all of the gear members have a standard gear tooth form. A carrier member is drivingly connected to one of the members and rotatably supports a pair of pinion gears eccentrically mounted relative to each other on the carrier. One ring gear is secured to a stationary housing and meshes with one of the pinions and a second ring gear drivingly connected to the other member and meshes with the other pinion. A third pinion gear which is an idler member in the system meshes with both of the other pinions through dual tangencies at the pitch diameters of the pinion gears.

3 Claims, 2 Drawing Figures

PATENTED DEC 12 1972

3,705,522

INVENTOR.
Fremont T. Ogawa
BY
Donald F. Scherer
ATTORNEY

SPEED CHANGE MECHANISM

This invention relates to speed change mechanisms and more particularly to speed change mechanisms providing a large input to output speed ratio in which standard tooth formed gearing is used.

The present invention provides a large speed ratio between the input and output members of a speed change mechanism through the use of standard gear tooth forms in a compound planetary gearing arrangement. In the preferred embodiment the carrier member is drivingly connected to the input shaft and one ring gear is drivingly connected to the output shaft. A second ring gear is secured to a stationary housing and provides a reaction member for the planetary gearing. A pair of pinion gears are rotatably mounted on an eccentric shaft secured to the carrier and mesh with the first and second ring gears respectively. A third pinion gear is also rotatably mounted on the carrier and meshes with the other two pinions at the pitch diameters thereof. To provide the high speed ratio between input and output, one of the ring gears has more teeth than the other and since the gear teeth have a standard tooth profile one ring gear has a larger diameter than the other. The eccentric shaft in the carrier permits the center line of one of the pinions to be located radially outside the center line of the other pinion thus permitting the pinions to mesh with the larger and smaller ring gear, respectively. The two pinion gears mesh with the idler pinion which has its pitch diameter so located as to be tangent to the pitch diameters of both the pinion gears. In the prior art gearing arrangements in which planetary gearing is used to provide a large gear ratio, a non-standard gear tooth form and accurately aligned gear clusters have been used. The present invention permits the use of standard gear tooth forms and avoids the use of cluster gears.

It is an object of this invention to provide in an improved planetary type speed change mechanism a compound planetary gearing arrangement utilizing standard tooth forms on all of the gear members and to eliminate the necessity for alignment of clusters.

It is another object of this invention to provide in an improved speed change mechanism a compound planetary gearing arrangement in which the carrier member rotatably supports a pair of standard tooth form planetary gears on an eccentric shaft member and an idler gear meshing with the first mentioned pinion gears on the pitch diameters thereof, a reaction ring gear meshing with one of the pinion gears and an output ring gear meshing with the other pinion gear.

These and other objects and advantages will be more apparent from the following description and drawings in which.

Figure 1:
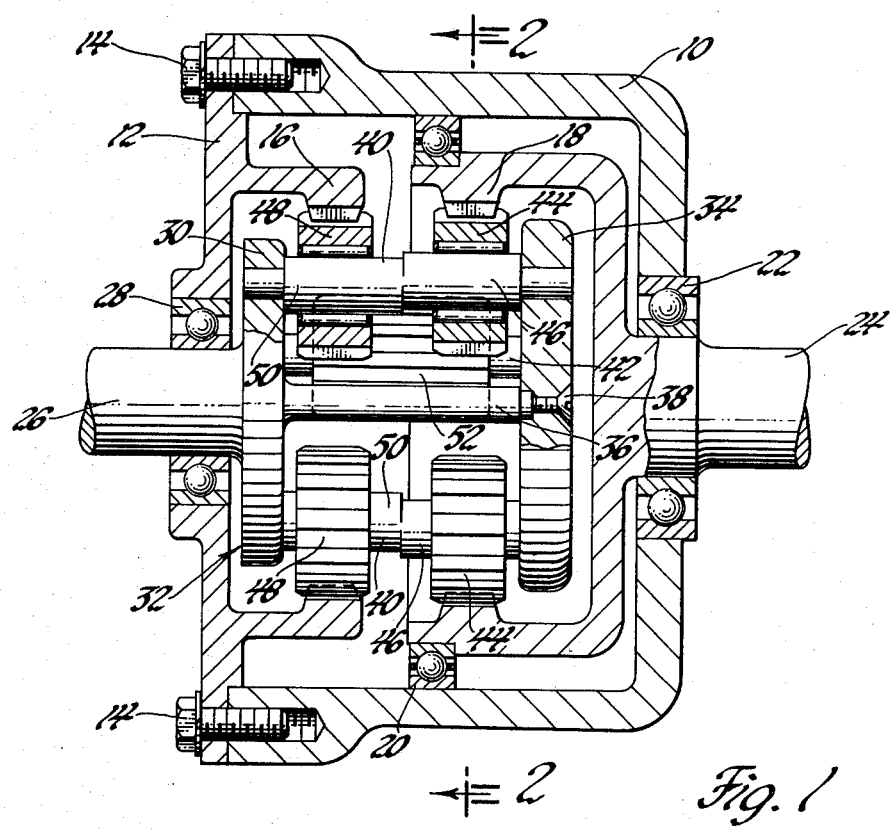
FIG. 1 is a cross sectional elevational view of the planetary gearing.
Figure 2:
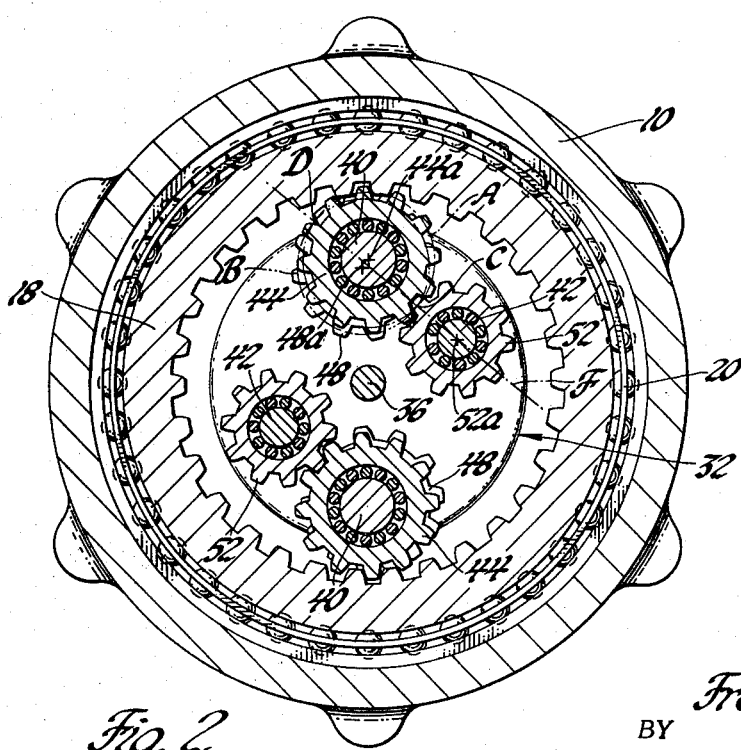
FIG. 2 is a cross sectional view taken along line 2—2 of FIG. 1.

Referring to the drawings and particularly FIG. 1 there is shown a stationary housing member 10 and a cover member 12 secured to the stationary housing 10 by a plurality of fasteners 14. A ring gear 16 is formed integral with or otherwise secured to the cover 12. A second ring gear 18 is rotatably mounted in the housing 10 by a pair of ball bearings 20 and 22 and is integrally formed with or otherwise secured to an output shaft 24. An input shaft 26 is rotatably mounted in the cover 12 by a ball bearing 28 and has integrally formed thereon a hub 30 which forms a portion of a planet carrier generally designated 32.

The planet carrier 32 also includes a hub 34 secured by a fastener 38 to a central shaft 36 formed on the hub 30, a pair of eccentric pinion shafts 40 and a pair of idler pinion shafts 42 all of which shafts are secured to the hubs 30 and 34.

A pair of pinion gears 44 are rotatably mounted on a portion 46 of the eccentric shaft 40 and mesh with the ring gear 18. A second pair of pinion gears 48 are mounted on another portion 50 of the eccentric shaft 40 and mesh with the ring gear 16. The center 44a of pinion gear 44 is located radially outward of the center 48a of the pinion gear 48. The pitch diameter A of the pinion gear 44 is therefore eccentric to the pitch diameter B of the pinion gear 48. A pair of long pinion gears 52 are mounted on the idler shafts 42 in a position such that the centers 52a thereof are located on the planet to permit the pinion gears 52 to mesh with the pinion gears 44 and 48 at mesh points which are tangent points of the pinion pitch diameters.

Because each pinion meshes with two gears all of the gears in the compound planetary gearing arrangement described above have a standard tooth form so that the gear members can be manufactured on conventional gear cutting machines. The gears also have the same diametral pitch.

The ring gear 18 has more teeth than the ring gear 16 and since the tooth forms of these gears are standard and the diametral pitches are equal, the diameter of the ring gear 18 is larger than the diameter of the ring gear 16. In the preferred embodiment the ring gear 18 has two more teeth than the ring gear 16 so that a high gear ratio is present between the input shaft 26 and the output shaft 24. If the ring gear 18 has 57 teeth and the ring gear 16 has 55 teeth, the input shaft 26 will have to be rotated 28.5 revolutions to obtain one revolution of the output shaft 24.

Obviously, many modifications and variations of the present invention are possible in light of the above teachings. It is, therefore, to be understood that within the scope of the appended claims the invention may be practiced otherwise than as specifically described.

What is claimed is:

1. A speed change mechanism comprising; a stationary housing; an input shaft rotatably mounted in said housing; planet carrier means drivingly connected with said input shaft and including first and second mounting means eccentric to each other; an output shaft rotatably journaled in said housing; a first ring gear drivingly connected with said output shaft; a second ring gear secured to said housing; a first planet pinion rotatably on said first mounting means and meshing with said first ring gear; a second planet pinion rotatably mounted on said second mounting means with the center line thereof in a position eccentric with said first planet pinion and meshing with said second ring gear; and a third planet pinion rotatably mounted on said carrier means and meshing with said first and second planet pinions at points tangent to the pitch diameters of said first and second planet pinions to transmit rotary motion from one of said planet pinions to said other of said planet pinions.

2. A speed change mechanism comprising housing means; input means; output means; carrier means drivingly connected with said input means including eccentric pinion mounting shaft means, first pinion means having a standard tooth form rotatably mounted on said eccentric pinion mounting shaft means; second pinion means having a standard tooth form rotatably mounted on said eccentric pinion mounting shaft means eccentrically relative to said first pinion means; first ring gear means having a standard tooth form and meshing with said first pinion means and secured to said housing means; second ring gear means having a standard tooth form and meshing with said second pinion means and being drivingly connected with said output means; and idler gear means having a standard tooth form and meshing with said first and second pinion means at points tangent to the pitch diameters thereof to transmit rotation from one pinion means to the other pinion means.

3. A speed change mechanism comprising a stationary housing; an input shaft rotatably mounted in said housing; planet carrier means drivingly connected with said input shaft and including an eccentric shaft having eccentric mounting means; an output shaft rotatably journaled in said housing; a first ring gear drivingly connected with said output shaft; a second ring gear secured to said housing; a first planet pinion rotatably on said eccentric shaft and meshing with said first ring gear; a second planet pinion rotatably mounted on said eccentric shaft with the center line thereof in a position eccentric with said first planet pinion and meshing with said second ring gear; a third planet pinion rotatably mounted on said carrier means and meshing with said first and second planet pinions at points tangent to the pitch diameters of said first and second planet pinions to transmit rotary motion from one of said planet pinions to said other of said planet pinions; and all of said gears having a standard tooth profile and the same diametral pitch.

\* \* \* \* \*